United States Patent [19]

Blanchard

[11] Patent Number: 5,543,870
[45] Date of Patent: Aug. 6, 1996

[54] REAR PROJECTION SCREEN WITH HIGH OFF-AXIS SUNLIGHT REJECTION

[75] Inventor: Randall D. Blanchard, Vista, Calif.

[73] Assignee: Palomar Technologies Corporation, Carlsbad, Calif.

[21] Appl. No.: 319,342

[22] Filed: Oct. 6, 1994

Related U.S. Application Data

[63] Continuation of Ser. No. 40,417, Mar. 31, 1993, abandoned.

[51] Int. Cl.$^6$ .................................................. G03B 21/00
[52] U.S. Cl. ................... 353/74; 353/97; 359/49
[58] Field of Search .................... 353/74, 75, 97, 353/122; 359/40, 41, 42, 49, 48, 69, 454, 455, 456, 457, 460, 450; 353/38; 358/60, 231, 254, 255; 348/744

[56] References Cited

U.S. PATENT DOCUMENTS

| | | | |
|---|---|---|---|
| 4,735,495 | 4/1988 | Henkes | 359/42 |
| 4,882,617 | 11/1989 | Vriens | 358/60 |
| 4,961,642 | 10/1990 | Ogino | 353/74 |
| 5,135,300 | 8/1992 | Toide et al. | 359/48 |
| 5,159,478 | 10/1992 | Akiyama et al. | 359/69 |
| 5,184,238 | 2/1993 | Wright | 359/70 |

FOREIGN PATENT DOCUMENTS

| | | |
|---|---|---|
| 0122829 | 10/1984 | European Pat. Off. . |
| 0436853 | 7/1991 | European Pat. Off. . |
| 9311452 | 6/1993 | European Pat. Off. . |
| 2151386 | 7/1985 | United Kingdom . |

OTHER PUBLICATIONS

Patent Abstracts of Japan; vol. 8, No. 92 (P–271); 27 Apr., 1984; and JP–A–59 007 928 (ALPS DENKI KK); 17 Jan. 1984; Abstract; "Transmission Type Liquid Crystal Display Device".

*Primary Examiner*—William Dowling
*Attorney, Agent, or Firm*—Rodney F. Brown

[57] ABSTRACT

A projection system having a rear projection screen (28) employs a collimating lens (26) in the form of a Fresnel lens adjacent the rear surface of the screen (28) to improve the image luminance at various viewing angles and provide uniform brightness over the area of the screen. A fiber optic face plate (30) or two crossed films of microlouver light control material is interposed between the collimating Fresnel lens (26) and the rear of the projection screen (28) to provide a high degree of blocking of high intensity light, such as sunlight, that may impinge upon the front of the screen. The optical fibers (42) of the fiber optic face plate have a low numerical aperture and an opaque cladding. The arrangement allows an image to be provided on the screen with high contrast even in the presence of sunlight striking the screen.

16 Claims, 2 Drawing Sheets

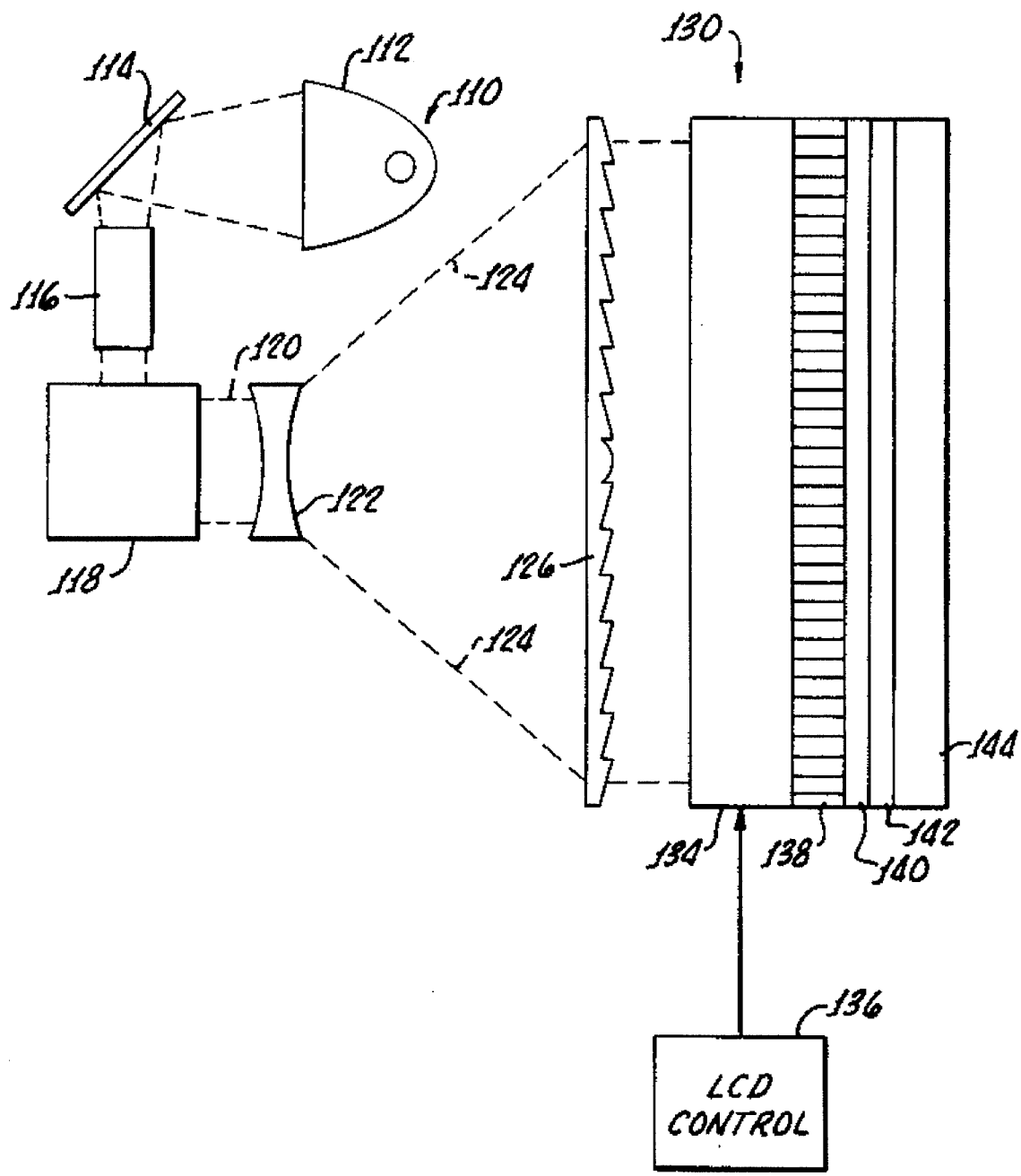
_FIG. 4._

REAR PROJECTION SCREEN WITH HIGH OFF-AXIS SUNLIGHT REJECTION

This is a continuation of application Ser. No. 040,417, filed Mar. 31, 1993 and now abandoned.

BACKGROUND OF THE INVENTION

1. Field of the Invention

The present invention relates to projection systems having a rear projection screen, and more particularly concerns control of adverse effects of high intensity ambient light impinging on the front surface of the screen.

2. Description of Related Art

Optical projection display systems are most commonly employed for viewing in darkened areas, such as a darkened theater, for example, because of the adverse effects of reflections of ambient light. However, in many applications, such as in avionics, for example, where a display must be viewed in an open cockpit which is brightly lit by natural daylight or even sunlight, image contrast is greatly degraded. Significant difficulties have been encountered in various attempts to provide a useful image with sufficient contrast in a brightly lit environment.

Particularly in systems having a short projection length lens, various elements of the projecting optical system may be positioned so close to the rear surface of a rear projection screen that sunlight at the front face of the screen will pass through the screen to be reflected from lens elements of the projection system back through the screen. Such reflected sunlight significantly degrades contrast and viewability of the image. Anti-reflection coatings on the lens elements may decrease but cannot satisfactorily eliminate such bright ambient light reflections. For sunlight rejection absorption filters are typically used at a great cost in decreased efficiency.

Accordingly, it is an object of the present invention to avoid or minimize above mentioned problems.

SUMMARY OF THE INVENTION

An optical projection system embodying principles of the present invention includes a rear projection screen having a screen axis, imaging means for projecting modulated collimated light to the rear face of the screen and light blocking means interposed between the imaging means and the screen for blocking light transmitted at a relatively large angle to the screen axis while passing light transmitted at a relatively small angle to the screen axis. According to a feature of the invention, light directed to the rear face of a rear projection screen is transmitted through a collimating Fresnel lens that gives a uniform brightness across the screen surface. In one form of the invention the light blocking means comprises a fiber optic face plate interposed between the collimating Fresnel lens and the screen and formed of fibers having a relatively small numerical aperture. Stated otherwise, the fibers of the fiber optic face plate have a small acceptance cone angle and thus effectively transmit only the collimated light, or nearly collimated light, from the Fresnel lens, but block light that is incident on the fiber optic face plate at larger angles.

In another arrangement of the invention a pair of crossed films of microlouver material provide the equivalent small angle light transmission while blocking high angle light transmission.

BRIEF DESCRIPTION OF THE DRAWINGS

In the accompanying drawings:

FIG. 4 is a schematic illustration of a flat panel projection system embodying principles of the present invention.

DESCRIPTION OF THE PREFERRED EMBODIMENTS

Figure 1:
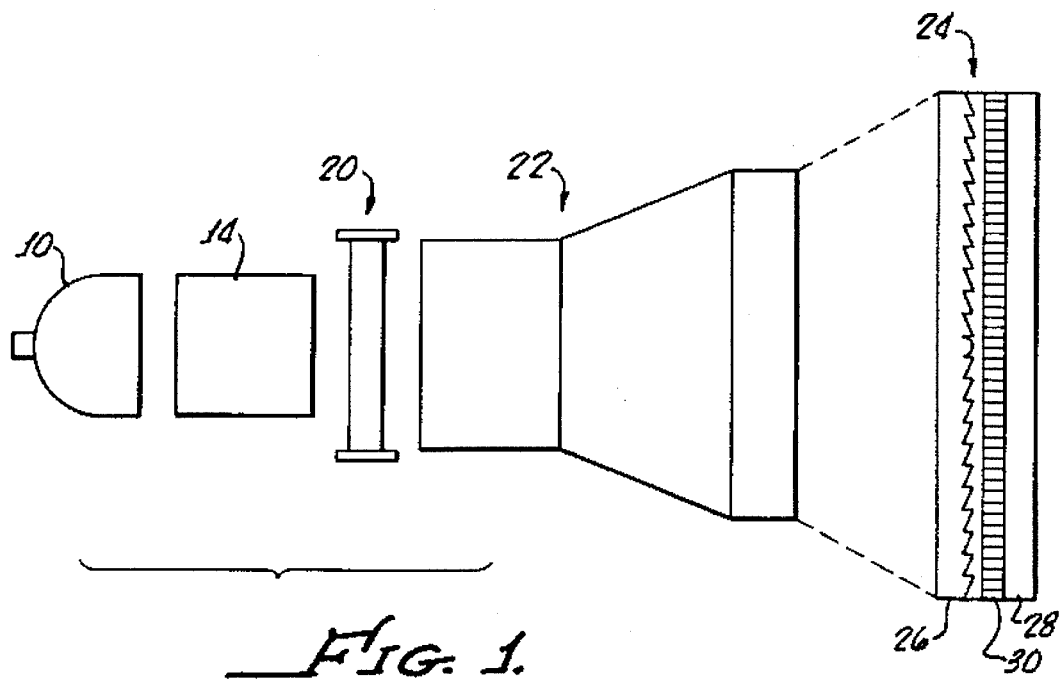
FIG. 1 is schematic illustration of a liquid crystal light valve projection system embodying principles of the present invention.

Illustrated in FIG. 1 is a simplified transmissive liquid crystal projection system employing an active matrix liquid crystal module. High intensity light from a source, such as an arc lamp 10, is directed along light paths (frequently including a folding cold mirror, not shown) to a polarizing beam splitter prism 14 which transmits light of a first linear polarization state and reflects light of a second linear polarization state. The polarizer 14 may include a polarization light recovery system which effectively changes all of the unpolarized light to light of a single polarization state and thus loses relatively little light in the polarization process. Such a polarization recovery system is disclosed in a co-pending application for Polarized Light Recovery, Ser. No. 935,622, filed Aug. 26, 1992, of Randall D. Blanchard, Eugene W. Cross, Jr. and Ronald D. Shirley (attorneys Docket 89-49-D and PD-91462). Details of this application are incorporated herein by this reference as though fully set forth. Light of the selected polarization state is transmitted to an active matrix liquid crystal light valve module 20 which includes an array or matrix of thin film transistors that are selectively operated in a predetermined spatial pattern to allow the polarized light to strike the face of the liquid crystal light valve module 20 and to be transmitted therethrough in a selected imaging pattern. Light transmitted through the liquid crystal light valve module is transmitted to a projection lens, generally indicated at 22, having a short projection length, which sends the projected image to a projection screen assembly, generally indicated at 24.

The screen assembly effectively comprises three components. The first of these, closest to the projection lens 22, is a collimating lens in the form of a flat Fresnel lens 26 that collects the expanding projection light beam from the projection lens and provides a uniform brightness of modulated collimated light (modulated by the liquid crystal module) across the area of the screen. An outer element of the screen assembly is formed by a rear projection screen 28 which may be formed of any suitable type of rear projection screen material. For example, the screen may be formed of a sheet of glass or transparent acrylic having embedded therein or coated on a surface thereof a plurality of diffusing particles, such as glass beads or microspheres, as is well known in the art. The function of the screen is to effectively diffuse the incoming image so as to enable viewing of the image from different viewing angles.

Interposed between the screen 28 and the Fresnel collimating lens 26 is a fiber optic face plate 30 formed of optical fibers having a very low numerical aperture. Preferably, each fiber is individually clad with an opaque or black cladding.

The fiber optic face plate 30 is a substantially conventional optical mosaic formed of a plurality of optical fibers much less than an inch in length that are fused together to form a glass plate. This plate need not be vacuum tight in the described application. Such a face plate, as is well known, effectively forms a zero thickness window, because the image formed on the inside surface is transported to the external surface with a minimum loss of light. Fibers in such face plates range in diameter from 5.5 to 75 microns, and each fiber is made of a core of glass having a first refractive index and a cladding of a glass having a second refractive index. In addition, it is preferred, in the described embodiment, to have each fiber clad with an opaque material (or to make the fiber cladding of a black glass) for better control of light that is off axis at significant angles.

Figure 2:
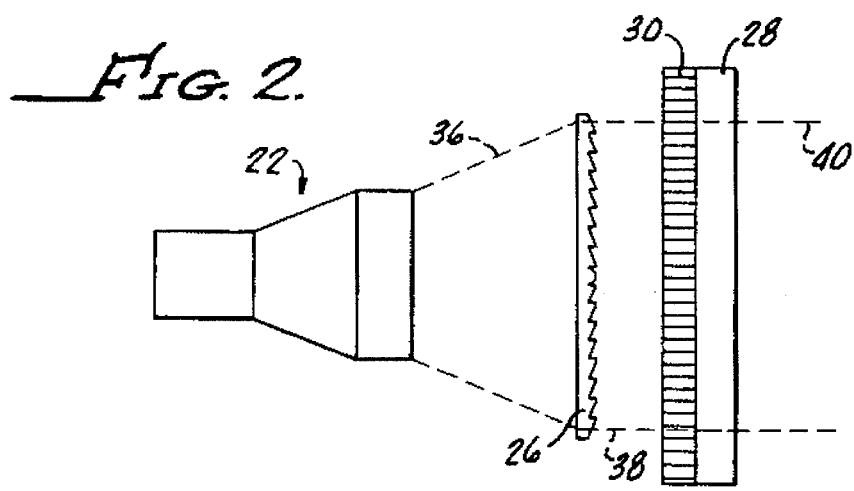
FIG. 2 is a simplified showing of certain elements of the arrangement of FIG. 1.

FIG. 2 illustrates certain of the elements of the projection system of FIG. 1 that will help to explain the need for and operation of the optical fiber face plate. Light from projection lens system 22, indicated by dotted lines 36 in FIG. 2, is projected at a relatively narrow cone angle to the Fresnel lens 26. The lens collimates the light, which then is transmitted in a beam, generally indicated at 38, with a small cone angle of about 3° to 6°. Momentarily omitting consideration, for the purpose of this discussion, of the presence of the fiber optic face plate, light with this very small cone angle is transmitted from the Fresnel lens to the rear projection diffusing screen 28. The screen radiates output light, as indicated by rays 40, that have been effectively scattered or diffused by the diffusing screen and thus are transmitted with a cone angle in the order of 7° to 45° from the front face of the screen 28. The displayed image is projected to and appears at the rear of the screen. It is formed essentially of light collimated by the Fresnel lens. The collimated light is diffused by screen 28 to provide a viewing angle or view angle pattern that is defined by the diffuser of the screen. It is important to note that the image rays are essentially parallel to one another between the Fresnel lens and the screen and are independent of the field of view or the viewing angle.

However, bright ambient light that may be incident upon the front face of the screen 28, such as sunlight, for example, is transmitted back through the diffusing rear projection screen to strike optical elements of the projection system, such as, for example, the Fresnel lens 26. This high intensity sunlight is then reflected back by the Fresnel lens through the diffusing screen to thereby greatly increase intensity and brightness of the image background, which provides a greatly degraded image contrast. Coating the Fresnel lens with an anti-reflection coating may reduce the reflected component of sunlight to as little as 1%, which is not acceptable in certain sunlight conditions.

By interposing between the collimating Fresnel lens and the rear projection diffusing screen a fiber optic face plate of suitably low numerical aperture, the nearly parallel highly collimated light of the image that is transmitted from the Fresnel lens to the screen will readily pass through the fiber optic face plate. This is so because the fiber optic face plate with its small acceptance cone angle will transmit light passing at a relatively small angle to the screen axis (e.g. perpendicular to the surface of the screen). High intensity ambient light at the front face of the screen, including sunlight, impinging on the screen and transmitted through the screen back to the fiber optic face plate at relatively larger angles is blocked by the fiber optic face plate and cannot be transmitted therethrough. This is illustrated in FIG. 3.

Figure 3:
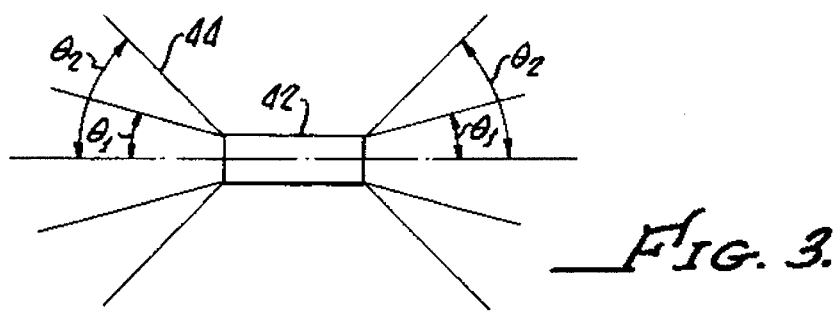
FIG. 3 illustrates certain geometric relations pertinent to a fiber optic face plate.

FIG. 3 illustrates geometry of a single clad optical fiber 42 having an acceptance cone half angle $\theta_1$ and a lower numerical aperture. Numerical aperture of an optical fiber is defined as the sine of the half angle of the acceptance cone, that is sine of $\theta_1$, as illustrated in FIG. 3. The numerical aperture of an optical fiber is a basic descriptive characteristic of a specific fiber and is based upon the relation between the index of refraction of the core material and the index of refraction of the cladding. The acceptance angle, or acceptance cone, of a fiber effectively defines the cone angle in which the fiber will accept and transmit light from one end thereof to the other. This light is transmitted with very little transmission loss because light within this cone angle is transmitted by means of total internal reflection within the fiber at the interface between the core and its cladding. Light entering an end of the fiber at an angle that is outside of the acceptance cone angle is not transmitted through the fiber by total internal reflection, but possibly might be transmitted in various angles transverse to the fiber axes, and thus can be transmitted across a fiber optic face plate. Thus, for example, a light ray indicated at 44 in FIG. 3 impinging on the fiber at a half cone angle of $\theta_2$, which is greater than the half angle of the acceptance cone angle, cannot be transmitted by total internal reflection through the fiber but may be transmitted across the fiber and across both its core and its cladding, effectively following the path of the ray 44, without reflection, from one side of the fiber optic face plate to the other. To eliminate this type of transmission the fibers of a fiber optic face preferred for use in the present invention are clad with an opaque or black cladding in addition to the cladding that provides for the total internal reflection. Alternatively, it is contemplated that the cladding of the core be formed of an opaque or black glass so that only a single cladding is employed.

A perfect light diffuser is termed a "Lambertian" source, which is a source that looks equally bright from all directions and transmits a light flux proportional to the cosine of the angle from the normal. Collimated light, on the other hand, of course provides light rays that are substantially parallel to one another. Collimated light is transmitted through optical fibers in substantially the same percentage range over a very wide range of numerical apertures. However, as the numerical aperture decreases, transmission of Lambertian light, that is light from a diffuse source, greatly diminishes. For example, with a fiber optic face plate made by INCOM, Inc. of Southbridge, Mass., having a numerical aperture of 0.85 there will be transmitted 74% of incident collimated light and as much as 56% of incident Lambertian light, whereas a fiber optic face plate having a numerical aperture of 0.35 transmits 75% of incident collimated light and only 10% of incident Lambertian light. Similarly, a fiber optic face plate made by Collimated Holes, Inc. of Campbell, Calif. and having a numerical aperture of 0.66 will transmit 70–75% of collimated light and 30–35% of Lambertian light. With a collimated face plate having a numerical aperture of 0.35 the collimated light transmission is 60–65%, whereas Lambertian light transmission is down to 10–15%. Moreover, with a Collimated Holes, Inc. fiber optic face plate having a numerical aperture of 0.24, collimated light transmission remains at 60–65% but Lambertian light transmission is decreased to 5–10%. These examples show the significant effect of a low numerical aperture in blocking light incident at relatively large angles. Thus the interposition of the fiber optic face plate 30 between the collimating Fresnel lens and the rear projection diffusing screen 28 effectively passes the collimated, image modulated light transmitted from the Fresnel lens at a small angle (within the fiber optic acceptance cone) to the screen axis, but blocks light transmitted from either direction at a relatively large angle to the screen axis.

In the practice of the present invention it is preferred to use a fiber optic face plate having fibers with a numerical aperture of less than about 0.50 and preferably about 0.24 or 0.35, or as low as 0.06. The optimum value is selected by evaluating when attenuation of the display image vs. attenuation of background due to sunlight gives maximum contrast.

The operation of the optical fiber is the same for light coming in from one side or the other, so that by utilizing a fiber optic face plate having a very low numerical aperture, the collimated light, being modulated with the image to be displayed, enters the fibers of the fiber optic face plate at relatively small angles to the screen axis, and substantially all of this light is transmitted. No significant amount of image light is lost since all of the image light is collimated. Ambient light striking the front face of the screen, on the other hand, may come in from many different angles, both large and small. Only a small amount of the ambient light strikes the front face of the screen at a small angle to the screen axis, within the optical fiber acceptance cone angle, for transmission back to the lens elements of the projection system. However, even this small amount of light striking the collimating Fresnel lens is scattered to a significant degree as it is reflected from the Fresnel lens, and thus very little will be returned to the fiber optic face plate within the small acceptance cone angle of the fibers. Light striking the fiber optic face plate outside the maximum angle of acceptance, as defined by the numerical aperture, will strike the opaque cladding and thus be absorbed.

Illustrated in FIG. 4 is a modified type of liquid crystal projection system of the type more particularly disclosed in a co-pending application for Flat Panel Display With Collimated Light Source, of Randall Blanchard, Ser. No. 08/040,648, filed Mar. 31, 1993. The details of this application are incorporated herein by this reference as though fully set forth. In this arrangement a high intensity light source 110, which may be a metal halide lamp, or a Xenon arc lamp, for example, includes an elliptical reflector 112 that directs light to a cold mirror and heat filter 114. Heat generated by the high intensity lamp is dissipated to a significant extent at the cold mirror, which may be provided with a suitable heat dissipating arrangement (not shown). The light beam is bent at substantially 90° and reflected from the cold mirror to pass through a light integrating tube 116, which may take the form of a square cross section glass body that effectively provides a total internal reflection. Integrating tube 116, alternatively, may be formed by a hollow square tube having internal mirrored surfaces. In an exemplary system such a tube may be approximately ¼ inches square and have a length of 1 ½ inches.

The purpose of the tube is effectively to integrate the light from the arc lamp 110 to provide the light beam with a substantially uniform intensity over the entire beam area. Thus the uniform intensity of the resulting light beam is independent of the varying spatial intensity distribution of light actually generated by the arc itself.

A light beam of uniform intensity from integrator 116 is fed to a polarization prism 118, which effectively polarizes the light from the beam to provide an output beam 120 directed at right angles to the path of the light beam from the integrator and having only a single polarization state. Polarizer 118, if deemed necessary or desirable, may be a polarization recovery prism of the type previously described in connection with FIG. 1. Polarized light from the polarization prism is fed to a beam expanding lens 122, which expands the beam as indicated by dotted line 124, to cover substantially the entire area of a flat collimating Fresnel lens 126.

The Fresnel lens 126 is mounted closely adjacent to and substantially in contact with the rear face of a liquid crystal module display assembly, generally indicated at 130. The liquid crystal module display assembly forms a flat panel having a plurality of layers in face to face contact. A first layer 134 comprises an active matrix liquid crystal light valve module driven by control electronics, generally indicated at 136, and which may be of the type described above and designated by reference numeral 20 in FIG. 1. At the front face of the liquid crystal module 134 is a layer of black clad fiber optics forming a thin fiber optic face plate 138. This face plate may be the same as the fiber optic face plate 30 illustrated in FIG. 1, having an opaque cladding and a low numerical aperture.

The fiber optic face plate 136, just as previously described, effectively provides for rejection of sunlight striking the display at an angle greater than the relatively small acceptance cone angle of the fiber optic face plate.

The next layer of the liquid crystal module assembly 130 is a rear projection screen or diffuser 140 which may provide a rear projection screen having a controlled pattern of diffusion. A full disclosure of such a rear projection screen and its diffusion characteristics are set forth in a related application for Elliptical Diffuser, Ser. No. 08/071,126, filed Jun. 2, 1993. Details of this application are incorporated herein by this reference as though fully set forth. Briefly, the rear projection screen 140 is formed by a matrix in which are embedded a number of diffusing particles, such as microspheres, that initially have a uniform isotropic density distribution. The material is stretched in a single direction, such as a vertical direction, to greatly decrease the density of the diffusing particles in the vertical direction while leaving the distribution density of particles in the horizontal direction substantially unchanged. With this asymmetry of diffusing particle distribution, the diffuser acts to receive the incoming light and provide an elliptical output diffusing pattern. That is, screen gain for this diffuser is greatly increased for a narrow vertical viewing angle because much of the light that would otherwise have been transmitted at large vertical viewing angles is concentrated in the narrow vertical viewing angle. Screen gain in horizontal viewing angles is also increased.

Positioned adjacent the outside of the diffuser rear projection screen 140 is a layer of polarizing material 142 that further minimizes reflection of sunlight from internal elements.

A final exterior anti-reflection coating 144 is applied to the outer face of the polarizing sheet 142. The anti-reflection layer 144, in a preferred embodiment, may take the form of a glass sheet with suitable anti-reflection coating.

A light beam having a single polarization state and uniform intensity over its entire area is effectively generated by the system and transmitted to the flat Fresnel collimating lens 126. Accordingly, collimated light of a single polarization state and of a high uniformly distributed intensity is transmitted to the rear face of the liquid crystal display panel. Activation of the individual pixels of the liquid crystal under control of information provided by electrical signals from LCD control 136 causes light to be transmitted through the liquid crystal display panel with polarization states distributed over the various pixels of the LCD panel. The transmitted light has a spatial distribution of light of a selected polarization according to the spatial distribution of those of the LCD pixels that are activated. The collimated, image modulated light is transmitted from the liquid crystal module and through the fiber optic face plate, which has a low numerical aperture, and then to the elliptical diffuser of the rear projection screen 140. The image is formed substantially at the front face of the liquid crystal module, at the interface between the fiber optic face plate 138 and the liquid crystal module 134. Thus, even when viewed at an angle, the image forming light has been transmitted through the liquid crystal material in a direction substantially normal to the liquid crystal display module surface. Therefore, contrast of the image does not significantly vary with viewing angle, and color remains substantially the same with variation in viewing angle. In this arrangement, effectively none of the collimated light is transmitted at an angle to any portion of the liquid crystal module, and thus the liquid crystal module acts in the same manner on all light rays, since they all traverse the same length path across the liquid crystal module. Light passing through the rear projection diffusing screen 140 is then effectively filtered by the polarization sheet 142 and passes through the anti-reflection coated glass front plate 44.

In the arrangement of FIG. 4 translation of the display image from the rear of the fiber optic face plate to the front of the fiber optic face plate effectively adds some diffusion to the image so that the diffusion effect of the screen is further enhanced.

The ends of fibers of the fiber optic face plates may be cut at a slight angle to the plane of the face plate, such as an angle of 15° for example, so as to bend the output axis of the fibers. Effectively, when the fiber ends are cut at such an angle, the axis of the exit cone of the fiber is tilted and remains normal to the cut end. One way to achieve this is to align all fibers at an angle other than 90° relative to the planes of the face plate surfaces. In such an arrangement the direction of the collimated light from lens 26, is aligned with the now tilted fiber axes. The collimated Fresnel lens now will be off axis but not tilted. Thus, for a screen employing an elliptical diffuser that provides a narrow vertical field of view, peak brightness would be provided at an angle away from the normal axis by this angled cutting of fibers of the fiber optic face plate.

The systems disclosed herein have a number of significant advantages. Both can be utilized in high ambient light, and in fact can be utilized in sunlight, at least in part because of the fiber optic face plate that actually prevents sunlight from passing through the display panel to the Fresnel lens 26 or 126 from which it otherwise might be reflected. Reflections of sunlight from the collimating lens that could otherwise occur in the absence of the fiber optic face plate, would seriously degrade quality of the image in such a high ambient light intensity application.

The screen configuration, employing a fiber optic face plate and a diffusing screen having an elliptical diffusing pattern, allows absorption of off-axis sunlight starting at relatively small angles away from the screen axis, while still allowing a wide viewing angle of the displayed screen image. Further, the diffuser in front of the face plate, having an elliptical diffusing pattern, defines a viewing angle of the screen independent of the fiber optic's performance.

The described systems are applicable to any situation where sunlight readability is desired. As previously mentioned, instead of utilizing a fiber face plate, microlouver material made by 3M Company of St. Paul, Minn., may be employed. Examples of such 3M Company light control films are LCF ABRO 0 OB 48 CLR GLS 0.035 inches and LCF ABRO 0OB 60 CLR GLS 0.030 inches. This material, when used with two sheets in crossed patterns, operates in substantially the same manner as described above for a low numerical aperture fiber optic face plate, in that it passes light transmitted at relatively small angles to a perpendicular to the film while blocking light transmitted at relatively large angles to a perpendicular to the film. The "acceptance angle" of this material is reduced by increasing thickness of the material.

Prior systems, without employing aspects of the present invention, provide a color display limited to a brightness of about 200 foot lamberts and having a contrast ratio of about 10:1. With features of the present invention employed in substantially similar projection systems, a brightness of 2,000 foot lamberts and a contrast ratio of 30:1 has been obtained. Further, the same high contrast when using a fiber optic face plate is maintained throughout the range of viewing angles. Accordingly, it will be seen that the combination of a substantially collimated, image modulated light source with a fiber optic face plate of low numerical aperture or with a pair of crossed microlouver films will transmit most of the image and provide high sunlight rejection. In other words, the fiber optic face plate or microlouver films have little effect on the display image when formed with substantially collimated light. By using opaque clad fibers ambient sunlight that reaches the face plate outside the small acceptance cone angle of the fibers is absorbed by the cladding. Because the diffuser defines the viewing angle and effectively diffuses the image through the wider viewing angle pattern produced by the diffusing screen, the image can be seen well beyond the small cone angle of the optical fibers.

Although collimated or substantially collimated light is obtained in the embodiments described above by use of a Fresnel lens, it will be appreciated that other sources of collimated or substantially collimated light may be employed. Thus, a projection lens having a long focal length may be employed in the light source, in which case the Fresnel lens is not used. A projection lens with a fairly long projection distance to the screen will eliminate the use of a Fresnel lens. The image rays are not collimated. They are slightly diverging (e.g. substantially or nearly collimated), but still captured by the acceptance angle of the fibers. A wide dispersion diffuser will reduce the effects of this compromise. This offers even better sunlight rejection because light transmission losses (25–35%) of the Fresnel lens are eliminated and reflections are eliminated. A reasonable distance of four times the screen diagonal is required for the projection distance. Therefore, this is not a compact configuration. A brightness drop off of up to 50% in the screen corners could also be expected. Thus, the lens system 22 of FIGS. 1 and 2 may include a projection lens having a long focal length and the Fresnel lens 26 would be omitted.

There are known light modulation panels that depend on light scattering to produce a variation of light transmission in a narrow cone angle optical system. The contrast ratio (e.g. ratio of "on" transmission to "off" transmission) has been relatively low for these panels; around 10:1. The fiber optic face plate could improve this contrast by rejecting more of the "off" scattered light. An example is the polymer dispersed liquid crystal display (PDLCD). It does not use polarizers and therefore has the potential for higher light output using an unpolarized light source. Such a polymer dispersed liquid crystal display may be employed in the projection system described herein and would benefit from use of the described fiber optic face plate.

What is claimed is:

1. An optical projection system comprising:

a rear projection screen having a screen axis, image forming means for transmitting an image toward a rear face of said screen, light source means for projecting a light beam to said image forming means, collimating means interposed between said screen and said imaging forming means for substantially collimating light transmitted toward said screen, and blocking means comprising a pair of crossed microlouver light control films interposed between said collimating means and said rear projection screen for passing light transmitted at a relatively small angle to said screen axis and blocking light transmitted at a relatively larger angle to said screen axis.

2. The optical projection system of claim 1, wherein said collimating means comprises a Fresnel lens.

3. An optical projection system comprising:

a rear projection screen having a screen axis, image forming means for transmitting an image toward a rear face of said screen, light source means for projecting a light beam to said image forming means, collimating means interposed between said screen and said imaging forming means for substantially collimating light transmitted toward said screen, and blocking means comprising a fiber optic sheet comprised of optical fibers having a low numerical aperture and having an opaque cladding interposed between said collimating means and said rear projection screen for passing light transmitted at a relatively small angle to said screen axis and blocking light transmitted at a relatively larger angle to said screen axis.

4. The optical projection system of claim 3 wherein said fiber optic sheet comprises optical fibers having a numerical aperture not greater than about 0.50.

5. The optical projection system of claim 3 wherein said fiber optic sheet comprises optical fibers having a numerical aperture not greater than about 0.35.

6. The optical projection system of claim 3 wherein said collimating means comprises a projection lens having a long focal length.

7. An optical projection system comprising:

a rear projection screen having a rear face and a screen axis, collimating means adjacent said screen for transmitting light to said rear face, light source means for transmitting light to said screen through said collimating means, image forming means for modulating light transmitted from said light source means to said collimating means, and light blocking means comprising a pair of crossed microlouver light control films interposed between said screen and collimating means for passing light transmitted at a relatively small angle relative to said screen axis and for blocking light transmitted at a relatively larger angle to said screen axis.

8. The optical projection system of claim 7 wherein said image forming means is interposed between said light source and said collimating means.

9. The optical projection system of claim 8 wherein said image forming means comprises an active matrix liquid crystal light valve.

10. The optical projection system of claim 7 wherein said image forming means is interposed between said collimating means and said screen.

11. An optical projection system comprising:

a rear projection screen having a rear face and a screen axis, collimating means adjacent said screen for transmitting light to said rear face, light source means for transmitting light to said screen through said collimating means, image forming means for modulating light transmitted from said light source means to said collimating means, and light blocking means comprising a fiber optic sheet comprised of optical fibers having a low numerical aperture and having an opaque cladding interposed between said screen and collimating means for passing light transmitted at a relatively small angle relative to said screen axis and for blocking light transmitted at a relatively larger angle to said screen axis.

12. The optical projection system of claim 11 wherein said fiber optic sheet comprises optical fibers having a numerical aperture not greater than about 0.35.

13. A projection system for use in a high ambient light environment comprising:

a rear projection screen having a screen axis and a rear face, imaging means for projecting modulated substantially collimated light to said rear face, and blocking means comprising a pair of crossed microlouver light control films interposed between said imaging means and said screen for blocking light transmitted at a relatively large angle to said screen axis and transmitting light transmitted at a relatively small angle to said screen axis.

14. A projection system for use in a high ambient light environment comprising:

a rear projection screen having a screen axis and a rear face, imaging means for projecting modulated substantially collimated light to said rear face, and blocking means comprising a fiber optic face plate comprised of optical fibers having a low numerical aperture and having an opaque cladding interposed between said imaging means and said screen for blocking light transmitted at a relatively large angle to said screen axis and transmitting light transmitted at a relatively small angle to said screen axis.

15. The projection system of claim 14 wherein said fiber optic face plate comprises optical fibers having a numerical aperture not greater than about 0.35.

16. The projection system of claim 14 wherein the ends of said optical fibers extend at a slight angle to the plane of said fiber optic face plate.

* * * * *